United States Patent [19]
Yano

[11] Patent Number: 6,008,937
[45] Date of Patent: Dec. 28, 1999

[54] BINOCULAR

[75] Inventor: Takaaki Yano, Hokkaido, Japan

[73] Assignee: Asahi Kogaku Kogyo Kabushiki Kaisha, Tokyo, Japan

[21] Appl. No.: 09/004,274

[22] Filed: Jan. 8, 1998

[30] Foreign Application Priority Data

Jan. 13, 1997 [JP] Japan .................................. 9-015899

[51] Int. Cl.$^6$ ............................ G02B 23/00; G02B 23/16
[52] U.S. Cl. ......................... 359/410; 359/407; 359/600; 359/610
[58] Field of Search ........................... 359/405, 407–422, 359/464–465, 480–482, 600, 601, 610, 614–615; 351/44–46, 156

[56] References Cited

U.S. PATENT DOCUMENTS

| | | | |
|---|---|---|---|
| 505,000 | 9/1893 | Price | 351/46 |
| 3,045,527 | 7/1962 | Billi | 359/610 |
| 3,737,567 | 6/1973 | Kratomi | 359/464 |
| 5,212,591 | 5/1993 | Funathu | 359/407 |
| 5,264,877 | 11/1993 | Hussey | 351/45 |
| 5,267,079 | 11/1993 | Riedl | 359/418 |
| 5,572,361 | 11/1996 | Kamiya et al. | 359/410 |
| 5,581,399 | 12/1996 | Abe | 359/410 |
| 5,677,789 | 10/1997 | Funatsu | 359/407 |

*Primary Examiner*—Thong Nguyen
*Attorney, Agent, or Firm*—Greenblum & Bernstein, P.L.C.

[57] ABSTRACT

A binocular includes first and second telescope systems, a focus adjustment mechanism and a diopter correction mechanism. The binocular is further provided with a shielding mechanism which selectively shields one of the telescope systems in response to a switch, and a locking mechanism which selectively locks one of the focus adjustment mechanism and the diopter correction mechanism in response to the switch.

15 Claims, 3 Drawing Sheets

BINOCULAR

BACKGROUND OF THE INVENTION

The present invention relates to a binocular.

Conventionally, a binocular includes two (left and right) telescope systems, a focus adjustment mechanism for focusing the telescope systems, and a diopter correction mechanism for adjusting a diopter of the telescope systems. In general, the focus adjustment mechanism is constructed to move two lens groups which respectively belong to two telescope systems of the binocular, while the diopter adjustment mechanism is constructed to move a lens group which belongs to one of the telescope systems (for example, the right telescope system). The binocular is provided with a focus adjustment knob for operating the focus adjustment mechanism and a diopter correction knob for operating the diopter correction mechanism.

In case where the lens group moved by the diopter adjustment mechanism belongs to the right telescope system, the diopter correction process includes the following two stages. In a first stage, an observer observes an object with left eye (through the left telescope system) and operates the focus adjustment knob thereby to focus the left telescope system on the object. In a second stage, the observer observes the same object with right eye (through the right telescope system) and operates the diopter correction knob thereby to focus the right telescope system on the object.

However, since the observer must close right eye in the first stage and close left eye in the second stage, the diopter correction process is troublesome. Further, when the observer closes one eye, it may affect the diopter characteristics of the other eye, which lowers the accuracy in the diopter correction. Although it is alternatively possible to put an external cover on the binocular to shield one of the telescope systems, it also makes the diopter correction process troublesome.

Furthermore, if the observer mistakenly operates the focus adjustment knob in the second stage, it may change the focus of left telescope system which has been set in the first stage. In this case, it is necessary to repeat the first stage.

SUMMARY OF THE INVENTION

It is therefore an object of the present invention to provide an improved binocular enabling an easy diopter correction.

According to an aspect of the present invention, there is provided a binocular including first and second telescope systems which have parallel optical axes, a switch, a shielding mechanism which selectively shields one of the telescope systems in response to the switch. With such an arrangement, since the telescope systems can be selectively shielded by means of the switch, it is not necessary for an observer to close one eye during the diopter correction process. Thus, the diopter correction can be easily operated.

In a particular arrangement, the binocular further includes a focus adjustment mechanism arranged to move two lens groups which respectively belong to the first and second telescope systems, a diopter adjustment mechanism arranged to move a lens group which belongs to the first telescope system, and a locking mechanism which selectively locks one of the focus adjustment mechanism and the diopter correction mechanism, in response to the switch.

Due to the locking mechanism, when the observer is going to operate one of the focus adjustment mechanism and the diopter correction mechanism, it is prevented that the observer mistakenly operates the other mechanism.

Conveniently, the locking and shielding mechanisms are operated according to (1) a first mode wherein the locking mechanism locks the diopter correction mechanism and the shielding mechanism shields the first telescope system, (2) a second mode wherein the locking mechanism locks the focus adjustment mechanism and the shielding mechanism shields the second telescope system, and (3) a third mode wherein the locking mechanism locks the diopter correction mechanism, without shielding any telescope system. Further, the mode is changed by the switch.

Thus, it is not necessary for the observer to close one eye during the diopter correction process. Additionally, when the observer is going to operate one of the focus adjustment mechanism and the diopter correction mechanism, it is prevented that the observer mistakenly operates the other mechanism. Preferably, the switch includes a press button. In this case, the above-mentioned mode is switched according to the number of the pressing of the press button.

Optionally, the shielding mechanism includes two liquid crystal display panels respectively provided in light paths of the two telescope systems, and a controller which controls the liquid crystal display panels. Further optionally, the locking mechanism includes brakes respectively provided to the focus adjustment mechanism and the diopter correction mechanism, and a controller which controls the brakes.

According to another aspect of the present invention, there is provided a binocular including two parallel telescope systems, a focus adjustment mechanism, a diopter correction mechanism, a switch, a view interrupter which selectively makes one of the telescope systems unobservable in response to the switch, and an operation inhibitor which selectively inhibits one of the focus adjustment mechanism and diopter correction mechanism in response to the switch.

DESCRIPTION OF THE PREFERRED EMBODIMENT

The present invention is described with reference to the preferred embodiment thereof.

Figure 1:
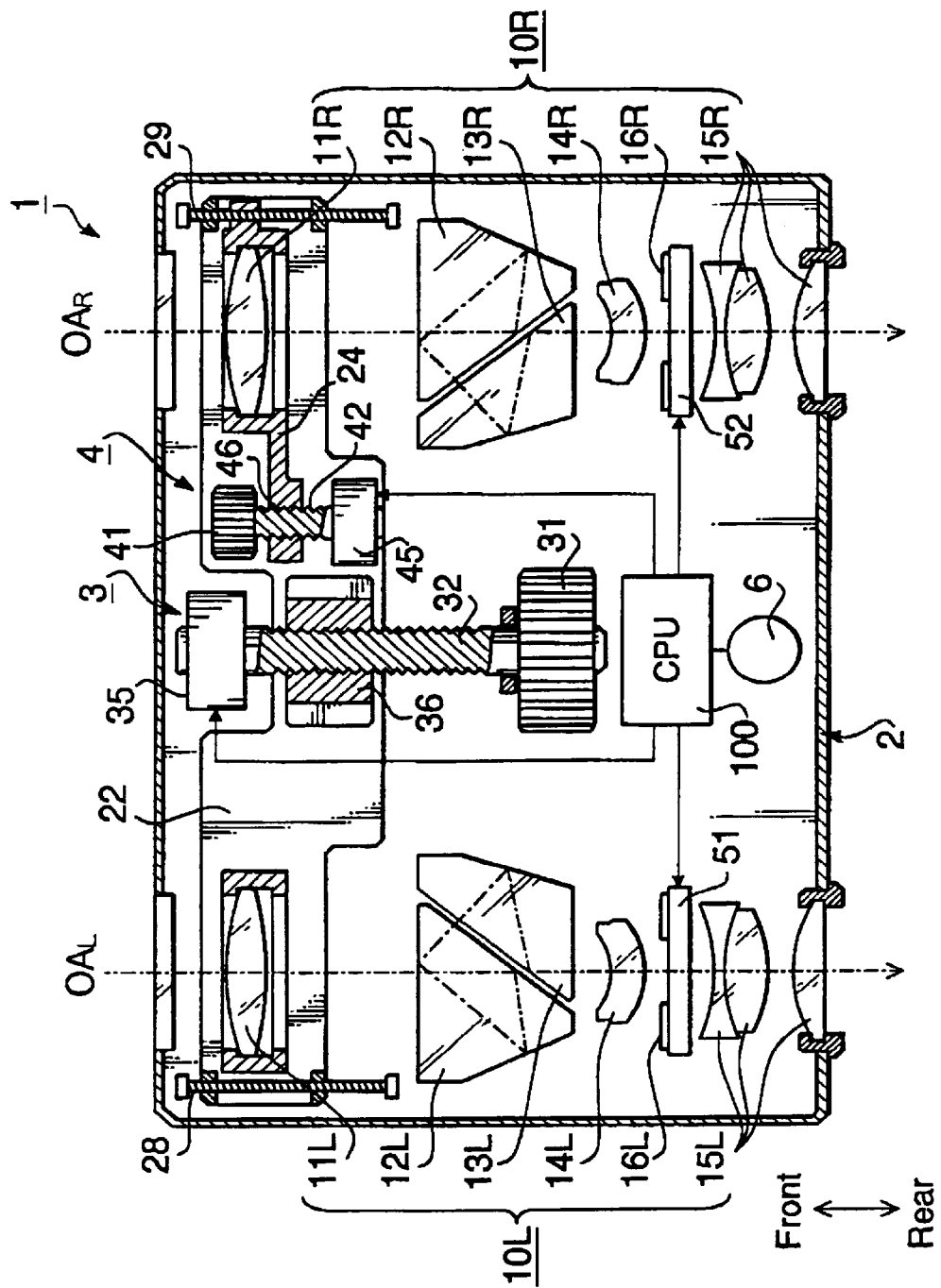
FIG. 1 is a plan view illustrating an internal structure of a binocular of the embodiment.
Figure 2:
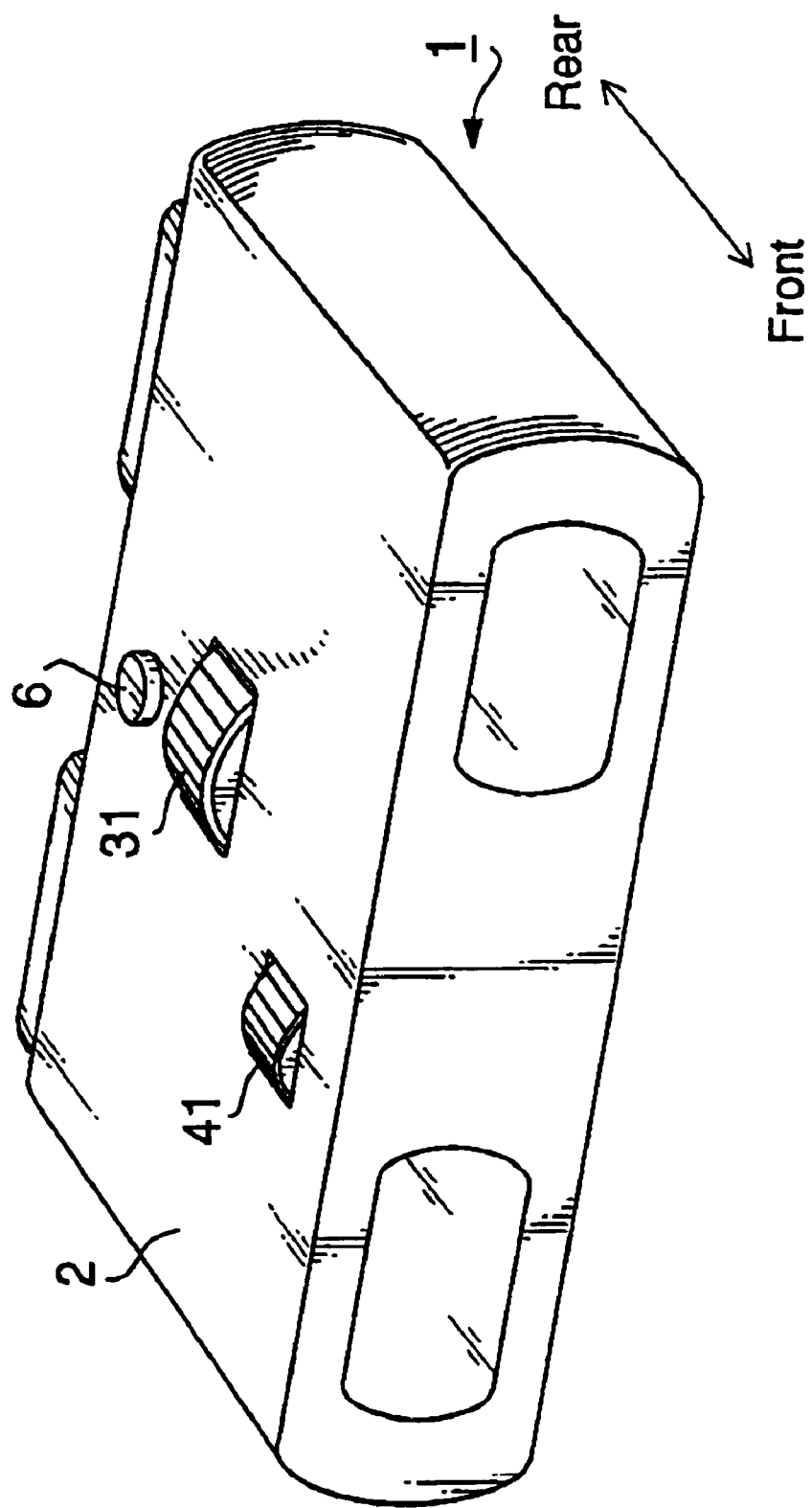
FIG. 2 is a perspective view illustrating an external shape of the binocular of FIG. 1.

FIG. 1 is a plan view showing an internal structure of a binocular 1 according to the embodiment. FIG. 2 is a perspective view showing an external shape of the binocular 1. As shown in FIG. 1, the binocular 1 includes left and right telescope systems 10L and 10R and a main body 2 accommodating the telescope systems 10L and 10R. Since the telescope systems 10L and 10R are symmetrical with each other, the description will deal with the left telescope system 10L and the corresponding reference numbers for the right telescope system 10R will be shown in brackets.

The telescope system 10L (10R) includes first lens 11L (11R), auxiliary prism 12L (12R), roof prism 13L (13R), second lens 14L (14R), and eyepiece lens 15L (15R), which are arranged along an optical axis OAL (OAR). The first lens 11L (11R) and the second lens 14L (14R) constitute objective system. The auxiliary prism 12L (12R) and the roof prism 13L (13R) constitute an erecting system. A field stop 16L (16R) is disposed where an image is formed by the objective system. The image formed by the objective system is magnified by the eyepiece lens 15L (15R) to be observed. The binocular 1 is a so-called straight viewing type binocular in which the optical axis OAL (OAR) of the eyepiece lens 15L (15R) is in line with the optical axis of first lens 11L (11R) of the objective system. Hereinafter, an objective system side of the binocular 1 is referred to as 'front', while an eyepiece side of the binocular 1 is referred to as 'rear'.

The binocular 1 is so constituted that the focus adjustment is performed by moving the first lenses 11L and 11R frontward and rearward along the optical axes OAL and OAR, respectively. Further, the binocular 1 is so constituted that the diopter correction is performed by moving the right first lens 11R frontward and rearward along the optical axis OAR.

A focus adjustment mechanism 3 is provided to move the first lenses 11L and 11R simultaneously. The adjustment mechanism 3 includes a first drive shaft 32 rotatably disposed in the main body 2 so that the first drive shaft 32 extends frontward and rearward. The first drive shaft 32 has an external thread. A focus adjustment knob 31 is fixed to the first drive shaft 32, which is projected upward from the top portion of the binocular 1 (FIG. 2), so that an observer can rotate the focus adjustment knob 31. A first nut 36 is provided to the movable table 22, which engages the external thread of the first drive shaft 32. With such an arrangement, the rotation of the focus adjustment knob 31 moves the first nut 36 forward and rearward so that the movable table 22 is moved forward or rearward. The first lenses 11L and 11R are placed on a movable table 22, which is guided by guide bars 28 and 29 provided at both lateral ends of the binocular 1 and extending forward or rearward. With such an arrangement when the observer rotates the focus adjustment knob 31, the first lenses 11L and 11R are moved forward or rearward.

The right first lens 11R is supported by a lens frame 24 which is further movable with respect to the movable table 22. A diopter correction mechanism 4 includes a second drive shaft 42 rotatably disposed on the movable table 22 so that the second drive shaft 42 extends frontward and rearward. The second drive shaft 42 has an external thread. A diopter correction knob 41 is fixed to the second drive shaft 42, which is projected upward from the top portion of the binocular 1 (FIG. 2) so that an observer can rotate the diopter correction knob 41. The lens frame 24 is provided with an internal thread 46 which engages the external thread of the second drive shaft 42, so that the rotation of the second drive shaft 42 moves the lens frame 24 forward and rearward. With such an arrangement, when the observer rotates the diopter correction knob 41, the right first lens 11R is moved forward or rearward.

The mechanism for selectively locking the focus adjustment mechanism and the diopter correction mechanism is described.

The focus adjustment mechanism 3 has a first brake 35. The first brake 35 is arranged to releasably hold the front end portion of the first drive shaft 32, so that the first brake 35 can brake the first drive shaft 32. The diopter correction mechanism 4 has a second brake 45. The second brake 45 is arranged to releasably hold the rear end portion of the second drive shaft 42, so that the second brake 45 can brake the second drive shaft 42. The first and second brakes 35 and 45 are controlled by a controller (CPU) 100 accommodated in the main body 2.

The first brake 35 is arranged to brake the first drive shaft 32 when the first brake 35 is energized and to release the first drive shaft 32 when the first brake 35 is not energized. On the other hand, the second brake 45 is arranged to brake the second drive shaft 42 when the second brake 45 is not energized and to release the second drive shaft 42 when the second brake 45 is energized. Thus, when the power is off (a voltage is not applied to each of the brakes 25 and 45), the first drive shaft 32 is rotatable (not locked) while the second drive shaft 42 is not rotatable (locked).

The mechanism for selectively shielding one of the telescoping systems is described. First and second LCD (Liquid Crystal Display) panels 51 and 52 are provided respectively behind the field stops 16L and 16R, for shielding the telescoping systems 10L and 10R. Each of the LCD panels 51 and 52 is arranged to block light when a voltage is applied thereto and to allow light to pass when a voltage is not applied thereto. When the first LCD panels 51 blocks light, the left telescope system 10L becomes unobservable. When the second LCD panels 52 blocks light, the right telescope system 10R becomes unobservable. The LCD panels 51 and 52 are separately driven by the controller 100.

The binocular 1 is provided with a switch 6 for operating the brake 35 and 45 and the LCD panels 51 and 52. The switch 6 is protruded from the top of the main body 1 as shown in FIG. 2, so that an observer can press the switch 6. The brakes 35 and 45, the LCD panels 51 and 52 and the controller 100 are driven by the power supplied by a not-shown battery accommodated in the main body 2.

Figure 3A:
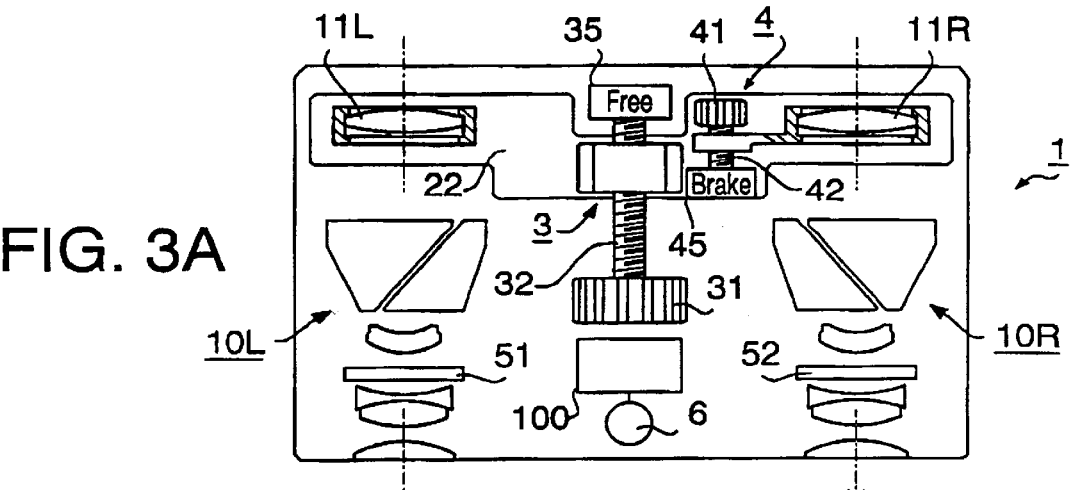
FIGS. 3A, 3B and 3C are schematic views illustrating a diopter correction process of the binocular of FIG. 1.
Figure 3B:
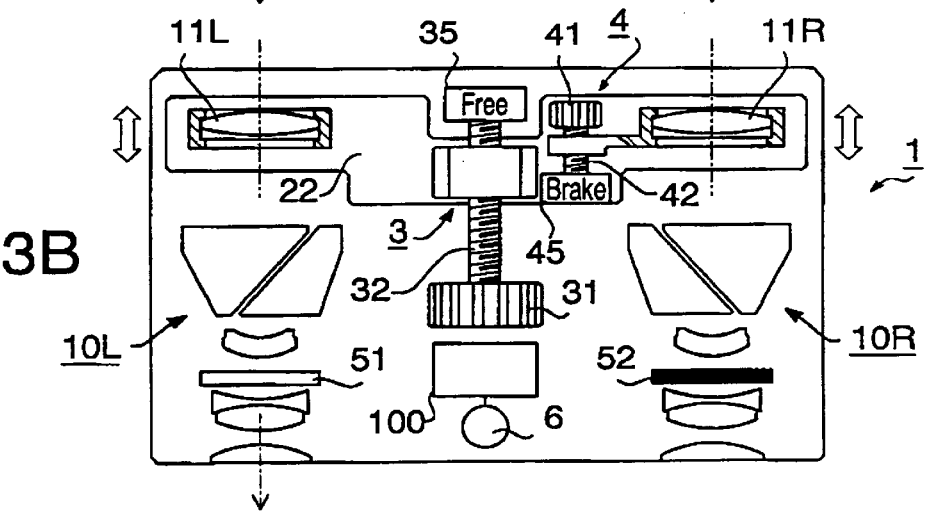
Figure 3C:
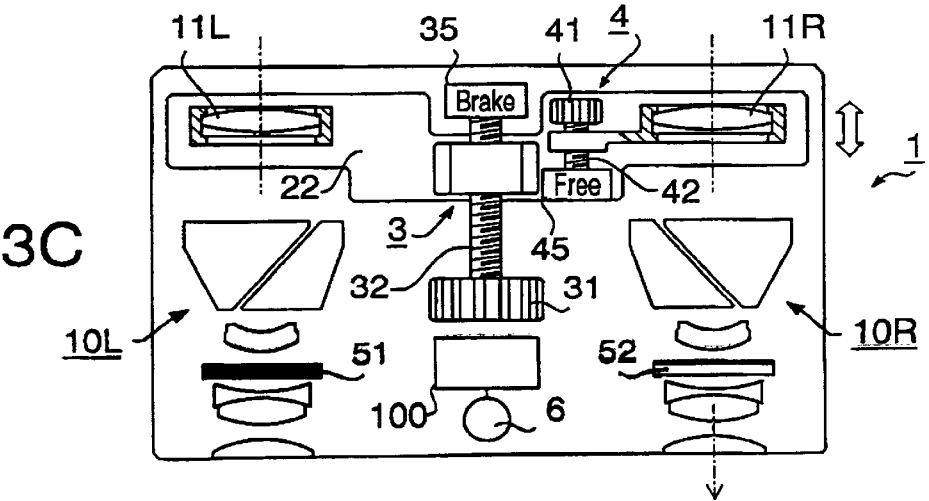

FIGS. 3A, 3B and 3C are schematic views illustrating a diopter correction operation of a binocular 1. In FIGS. 3A through 3C, an operating brake (which brakes the drive shaft) is indicated as 'Brake', while a non-operating brake (which releases the drive shaft) is indicated as 'Free'. As to the LCD panels 51 and 52, the LCD panel which blocks light is indicated with black, while the LCD panel which allows light to pass is indicated with white.

Before the switch 6 is pressed, a voltage is not applied to LCD panels 51 and 52. Thus, as shown in FIG. 3A, both telescope systems 10L and 10R are observable. Further, the brake 35 and 45 are not energized, so that the focus adjustment knob 31 is rotatable and the diopter adjustment knob 41 is not rotatable as described above.

When the switch 6 is pressed once (a first mode), as shown in FIG. 3B, the controller 100 energizes only the second LCD panel 52, so that the right telescope system 10R becomes unobservable and the left telescope system 11L remains observable. In this state, the first drive shaft 32 is still rotatable and the second drive shaft 42 is not rotatable. The observer observes an object with left eye (through the left telescope system 11L) and operates the focus adjustment knob 31 thereby to focus the left telescope system 11L on the object.

When the switch 6 is pressed once again (a second mode), as shown in FIG. 3C, the controller 100 energizes only the first LCD panel 51, so that the left telescope system 10L becomes unobservable and the right telescope system 10R becomes observable. Further, the controller 100 energizes the brake 35 while not energizing the brake 45, so that the second drive shaft 42 is rotatable and the first drive shaft 32 is not rotatable. The observer observes the object with right eye (through the right telescope system 11R) and operates the diopter correction knob 41 thereby to focus the right telescope system 11R on the object.

When the switch 6 is further pressed (a third mode), the controller 100 stops energizing the LCD panel 51 and the brake 35. Thus, the state of the LCD panels 51 and 52 and the brake 35 and 45 are as shown in FIG. 3A. That is, both telescope systems 10L and 10R are observable and the focus adjustment mechanism 3 is not inhibited, while the diopter correction mechanism 4 is inhibited.

As constructed above, it is possible for an observer to operate the diopter correction process with both eyes opened. Additionally, it is not necessary to put a external cover on the binocular to shield one telescope system. Thus, the diopter correction operation can be easily operated. Further, since the focus adjustment mechanism 3 is locked in the above-described second mode, it is prevented that the observer mistakenly operates the focus adjustment knob 31 in the second mode, causing the setting of the left telescope system 10L (which has been set in the first mode to) to change.

Although the LCD panels 51 and 52 are used for shielding the telescope systems 10L and 10R in this embodiment, it is possible to employ mechanical shutters. Further, it is possible to use mechanical locking arrangement instead of the brakes 35 and 45. Further, although the first lenses 11L and 11R are moved for focus adjustment and diopter correction in this embodiment, it is possible to move other lenses.

Although the structure and operation of a binocular is described herein with respect to the preferred embodiments, many modifications and changes can be made without departing from the spirit and scope of the invention.

The present disclosure relates to subject matter contained in Japanese Patent Application No. HEI 09-15899 filed on Jan. 13, 1997, the priority of which has been claimed under 35 U.S.C. § 119.

What is claimed is:

1. A binocular comprising:

first and second telescope systems which have parallel optical axes;

a focus adjustment mechanism arranged to move two lens groups which respectively belong to said first and second telescope systems;

a diopter adjustment mechanism arranged to move a lens group which belong to said first telescope system;

a switch;

a shielding mechanism which selectively shields one of said telescope systems, in response to an operation of said switch; and a locking mechanism which selectively locks one of said focus adjustment mechanism and said diopter correction mechanism, in response to an operation of said switch.

2. The binocular according to claim 1, wherein said locking mechanism locks said diopter correction mechanism when said shielding mechanism shields said first telescope system, and locks said focus adjustment mechanism when said shielding mechanism shields said second telescope system.

3. The binocular according to claim 2, wherein said locking and shielding mechanisms are operated according to the modes of:

a first mode wherein said locking mechanism locks said diopter correction mechanism and said shielding mechanism shields said first telescope system;

a second mode wherein said locking mechanism locks said focus adjustment mechanism and said shielding mechanism shields said second telescope system; and a third mode wherein said locking mechanism locks said diopter correction mechanism, with no telescope systems shielded.

4. The binocular according to claim 3, wherein each of said modes is switched by said switch.

5. The binocular according to claim 4, said switch comprising a press button, and wherein each respective one of said modes is switched according to a respective number of pressings of said press button.

6. The binocular according to claim 1, said shielding mechanism comprising:

two liquid crystal display panels respectively provided in light paths of said two telescope systems, and a controller which controls said liquid crystal display panels.

7. The binocular according to claim 6, wherein a respective one of said liquid crystal display panels is disposed in the vicinity of a field stop of each telescope system.

8. The binocular according to claim 1, said locking mechanism comprising:

brakes respectively provided to said focus adjustment mechanism and said diopter correction mechanism; and a controller which controls said brakes.

9. A binocular comprising:

first and second telescope systems which have parallel optical axes;

a focus adjustment mechanism for focusing said telescope systems;

a diopter correction mechanism for adjusting a diopter of said telescope systems;

a switch;

a view interrupter which selectively makes one of said telescope systems unobservable, in response to an operation of said switch; and an operation inhibitor which selectively inhibits one of said focus adjustment mechanism and said diopter correction mechanism, in response to an operation of said switch.

10. The binocular according to claim 9, wherein said focus adjustment mechanism is arranged to move two lens groups which respectively belong to said first and second telescope systems, and wherein said diopter adjustment mechanism is arranged to move a lens group which belongs to said first telescope system.

11. The binocular according to claim 10, wherein said view interrupter and said operation inhibitor are operated according to the modes of:

a first mode wherein said view interrupter makes said first telescope system unobservable and said operation inhibitor inhibits said diopter correction mechanism;

a second mode wherein said view interrupter makes said second telescope system unobservable and said operation inhibitor inhibits said focus adjustment mechanism; and a third mode wherein said operation inhibitor inhibits said diopter correction mechanism, with both telescope systems observable.

12. The binocular according to claim 9, said view interrupter including a shielding mechanism which selectively shields one of said telescope.

13. The binocular according to claim 12, wherein said shielding mechanism comprises:

two liquid crystal display panels respectively provided to said telescope systems; and a controller which controls said liquid crystal display panels.

14. The binocular according to claim 9, said operation inhibitor comprising a locking mechanism which selectively locks one of said focus adjustment mechanism and said diopter correction mechanism.

15. The binocular according to claim 14, wherein said locking mechanism comprises:

brakes respectively provided to said focus adjustment mechanism and said diopter correction mechanism; and a controller which controls said brakes.

* * * * *